United States Patent [19]
Durvaux et al.

[11] Patent Number: 5,703,910
[45] Date of Patent: Dec. 30, 1997

[54] DIGITAL RADIO RECEIVER

[75] Inventors: Marc Marie Ghislain Durvaux, Montighny-Le-Tileul; Raphael Paul Claude Cassiers, Brussels, both of Belgium

[73] Assignee: Alcatel N.V., Amsterdam, Netherlands

[21] Appl. No.: 727,175

[22] Filed: Sep. 30, 1996

Related U.S. Application Data

[63] Continuation of Ser. No. 136,806, Oct. 14, 1993, abandoned.

[30] Foreign Application Priority Data

Oct. 16, 1992 [EP] European Pat. Off. ............ 92203181

[51] Int. Cl.$^6$ .................. H03D 3/00; H03K 9/06
[52] U.S. Cl. ............... 375/322; 455/239.1; 455/308; 375/343; 330/135
[58] Field of Search ................. 375/322, 345, 375/343, 340, 324, 325; 455/210, 232.1, 234.1, 239.1, 308; 330/135

[56] References Cited

U.S. PATENT DOCUMENTS

| | | |
|---|---|---|
| 4,571,548 | 2/1986 | Jordan .................... 455/308 |
| 4,792,991 | 12/1988 | Eness . |
| 4,960,989 | 10/1990 | Liebenrood et al. .......... 250/227.15 |

OTHER PUBLICATIONS

Gilbert et al., "Monolethic DC-to-120-MHz Log-Amp is Stable and Accurate", Analog Dialogue, vol. 23, No. 3, 1989, pp. 3-6.

"Noncoherent detection of n/4-QPSK systems in a CCI-AWGN combined interferenceenvironment": by Chi-a-Liang Liu et al., Pro. IEEE 40th Vehicular technology conference, San Francisco, CA May 1989, pp. 83-94.

"Digital Communications", B. Sklar, Prentice-Hall 1988, pp. 100-104.

*Primary Examiner*—Stephen Chin
*Assistant Examiner*—Hai H. Phan
*Attorney, Agent, or Firm*—Ware, Fressola, Van Der Sluys & Adolphson LLP

[57] ABSTRACT

The present receiver includes a radiofrequency part (RF) coupled to a limiting amplifier (SL) which is in turn coupled to a demodulation means (DM) which recovers a digital signal from a received signal obtained by modulating a carrier signal with this digital signal. The limiting amplifier (SL) has an input-output characteristic which is substantially linear for smaller input signals and which strives with a decreasing gain towards a limit value for larger input signals. Due to this input-output characteristic smaller received signals are treated linearly up to the demodulation means (DM). The latter can therefore for these signals compensate for a specific spectrum shaping of the digital signal performed before the actual modulation. In this way the receiver will perform in a nearly optimal way resulting in low bit error rates. For larger received signals the limiting amplifier (SL) is non-linear and such compensation is consequently without effect resulting for these signals in a performance degradation. The Latter however is acceptable because these signals are naturally demodulated with less errors.

20 Claims, 1 Drawing Sheet

DIGITAL RADIO RECEIVER

This application is a continuation of application Ser. No. 08/136,806, filed on Oct. 14, 1993 now abandoned.

TECHNICAL FIELD

The present invention relates to a digital radio receiver wherein a digital signal is recovered from a received signal corresponding to a transmitted signal generated in a transmitter by angle-modulating a carrier signal with an analog signal converted from said digital signal and occupying a predetermined frequency band, said receiver including filter means, attenuating that part of said received signal outside said frequency band and so deriving an intermediate input signal, a limiting amplifier amplifying said intermediate input signal so that the amplified amplitude of the resulting intermediate output signal remains smaller than a limit value, and demodulation means recovering said digital signal from said intermediate output signal with a bit error rate below a predetermined error value if the received signal level falls within a predetermined dynamic range.

BACKGROUND OF THE INVENTION

Such a digital radio receiver is already known in the art, e.g. from the article "Noncoherent detection of π/4-QPSK systems in a CCI-AWGN combined interference environment" by Chia-Liang Liu et al., Proc. IEEE 40th Vehicular technology conference, San Francisco Calif., May 1989, pp. 83–94. This known radio receiver forms part of a digital mobile cellular communications system. Such a system operates according to a time and frequency division multiplex structure within which a number of mobile units can communicate via a base station.

The modulation method used in the transmitter has to be carefully chosen to optimize the bandwidth and power requirements of the system and to this end use is made of π/4-shifted Differential Quadrature Phase Shift Keying (π/4-DQPSK). This method belongs to a class of modulation methods generally referred to an angle-modulation, i.e. frequency or phase modulation. To improve the efficiency of such an angle-modulation method the transmitter includes, for converting the digital signal to the analog signal, in addition to a conventional digital-to-analog conversion circuit, a pulse shaping square root raised cosine roll off filter to reduce the intersymbol interference, as for instance described in detail in "Digital Communications", B. Sklar, Prentice-Hall, 1988, pp. 100–104. The performance of the above receiver can then be shown to be optimized if the filter means included therein is also a square root raised cosine roll off filter matched to the one in the transmitter, i.e. having the same roll off factor, as will be explained later.

The above known receiver is of the FM-discriminator type described in section III.3 of the above article, i.e. the demodulation means includes a discriminator.

As is well known in the art in using such a discriminator which performs an FM to AM conversion, the amplitude variations in the received signal appear in its output signal where they can no longer be distinguished from the demodulated FM-signal proper. Such amplitude variations can be a consequence of AM-interference and/or be a fundamental property of the modulation method. For instance, the above mentioned π/4-DQPSK modulation method produces a variable envelope signal, and is as such referred to as a linear modulation method. However, as the information in the transmitted signal obtained via such modulation can be retrieved solely from its phase, a discriminator type receiver can in principle be used in conjunction with this modulation method if due care is taken that the signal applied to the discriminator is a constant envelope signal.

The above limiting amplifier is in the known receiver therefore a hard limiter used to eliminate the mentioned amplitude variations from the signal applied to the demodulation means which includes the discriminator. The above is realized by the hard limiter by amplifying the signals so that their amplitudes are limited to the limit value and so producing the desired constant envelope signal.

The effects of the conversion of the digital signal to the analog signal in the transmitter cannot be compensated for in the receiver by a circuit following this non-linear limiting amplifier. Failing to compensate for this conversion would lead to an increase in the bit error rate. More particularly, intersymbol interference reduction can only be achieved when a square root raised cosine roll off filter matched to the raised cosine filter of the transmitter is used in the receiver. Therefore, in the known receiver, the necessary matched filtering, i.e. the square root raised cosine filtering, is performed by the filter means before the signal reaches the limiting amplifier.

Since an FM-discriminator operates typically at rather high frequencies the limiting amplifier and the filter means also have to operate at these rather high frequencies. Moreover, due to the limiting amplifier being non-linear this filter means not only has to be a matched filter with a specific impulse response as can be verified from the above, but also has to be very selective as it has to attenuate all frequencies outside the mentioned predetermined frequency band to avoid serious distortion caused by intermodulation products.

In order for a discriminator type receiver architecture to be feasible in mobile communication systems, which require near optimal receiver performance to get the bit error rate below the predetermined error value even for lower Signal-to-Noise-Ratio SNR, a very critical bandpass filter centered at rather high frequencies is needed. High frequency selective filtering in the range of a 100 KHz to a few MHz can only be done by quartz, ceramic, LC filters and the like. Commercially available filters of the above type yield a specific selectivity at specific center frequencies but have otherwise quite unspecified phase and amplitude responses. Specifying a specific impulse response for such a filter leads to expensive, complex and bulky filters if they can be reliably designed at all.

SUMMARY OF THE INVENTION

An object of the present invention is to provide a radio receiver of the above known type but which allows the use of a less complex and less expensive filter means.

According to the invention, this object is achieved due to the fact that said limiting amplifier has an input-output characteristic which is substantially linear for intermediate input signals having an amplitude smaller than a predetermined value and which strives with a decreasing gain towards said limit value for intermediate input signals having an amplitude larger than said predetermined value, each of said smaller and larger intermediate input signals corresponding to received signal levels within said dynamic range.

In this way the receiver has two extreme operating conditions for received signals falling inside the dynamic range specified for the digital mobile system.

For a received signal having a lower SNR and giving rise to smaller intermediate input signals, the receiver is substantially linear as the latter signal is treated in a substantially linear way up to the demodulation means. If, contrary to what is done in the prior art receiver, the above mentioned matched filtering is then performed in the demodulation means, i.e. after the limiting amplifier, the receiver has a near optimal performance so that the bit error rate for this lower SNR signal remains below the specified error value. Such a demodulation means may then for instance include a digital signal processor for reconstructing the digital signal. It is to be noted that such a processor can implement a number of demodulation schemes including the discriminator scheme but is not exclusively restrained to the latter scheme.

On the other hand, for a received signal with a higher SNR and giving rise to a larger intermediate input signal, the limiting amplifier is equivalent to the mentioned "hard limiter". Since the above matched filtering is performed in the demodulation means, the receiver performs sub-optimally as the matched filtering is not performed before the limiting amplifier. Such sub-optimal performance for a received signal with a higher SNR does not conflict with the specifications regarding the dynamic range as the bit error rate naturally tends to decrease for increasing SNR.

The invention can in this light be appreciated as based on the insight that it is not necessary to have an increasingly reliable performance for increasing SNR. Indeed, the specified error value is so determined that the error correcting codes used in the transmission protocol may provide a sufficient transmission quality in the presence of the latter error value so that for received signals with a higher SNR the increase in quality is both small and unneeded. In the present receiver therefore the unnecessary improvement in bit error rate is advantageously traded off against receiver complexity.

From the above it is clear that in the present receiver the filter means preceding the limiting amplifier has to be as selective as in the prior art receiver to avoid distortion due to intermodulation products. However it does no longer need to have a specific impulse response as e.g. the square root raised cosine filter may be positioned after the limiting amplifier as argued above.

A further advantage of the present receiver is that channel equalization just as matched filtering can be performed in the demodulation means, for instance in the digital signal processor, as the improvement obtained herewith is only useful for a received signal with a lower SNR. For this reason also the present invention is not only advantageous for the above described modulation scheme which needs matched filtering in the receiver but indeed for any modulation scheme if channel equalization is needed to reach a bit error rate which is sufficiently low.

It is to be noted that due to the drawbacks of the known limiter-discriminator receiver the latter is generally not used in digital mobile communications systems. Indeed, most prior art receivers in this field simulate a fully linear operation which however necessitates the use of an automatic gain control (AGC) loop as the dynamic range of the building blocks of the receiver are inevitably smaller than the dynamic range specified for the receiver. Such an AGC-loop however tends to be very complex, as very fast variations in the received signal level can be present due to random fading in the radio channel and also due to the time division multiplex structure within which the data is transmitted.

With respect to this known AGC-receiver the present receiver is better adapted to cope with such fast variations in the received signal levels without adding complex AGC-circuitry. This is due to the fact that no unneeded care is taken to optimally demodulate received signals with a higher SNR as mentioned above, whilst still avoiding an unallowable saturation of the demodulation means itself.

In this way the proposed receiver combines the advantages of the AGC-receiver, i.e. linear structure and the possibility of baseband digital processing, with the advantages of the limiter-discriminator receiver, i.e. easy adaptation to amplitude variations and simple implementation.

A characteristic feature of the present invention is that said demodulation means includes frequency translation means for translating said intermediate signal to baseband.

The angle-modulation used in such mobile communications systems is generally a type of quadrature modulation because this latter type of modulation is particularly well suited in the present field due to its bandwidth efficiency. The receiver is generally adapted to demodulate the two orthogonal waveforms separately. At the moment these waveforms are separated a limiting operation as needed in the present invention becomes rather difficult as independently limiting the separate signals yields a different result from limiting the composite signal. Therefore this separation is best done in the demodulation means and hence after the limiting amplifier by including in the demodulation means two suitable frequency translators.

Due to the above, the limiting amplifier has to operate at an intermediate frequency in the MHz range where the received signal is not yet split up in its orthogonal signals, the received signal only being translated to baseband after amplification in the limiting amplifier.

An important aspect of the present invention is that said limiting amplifier is a log-linear amplifier whose limit value equals the output signal level generated for the largest received signal level within said dynamic range.

Such an implementation of the limiting amplifier is particularly advantageous because log-linear amplifiers are commercially available, such as for instance the SL531 circuit from GEC PLESSEY Semiconductors, because the latter amplifiers are typically suited for operation at intermediate frequencies in the MHz range and because their gain characteristic is well suited for the present radio receiver. Indeed, the log-linear amplifier has a natural threshold effect due to the asymptotic behaviour of the log-function. Above this threshold, which is the aforementioned predetermined value, its input signals are substantially limited to the above mentioned limit value, well below the threshold the gain is substantially linear and rather high.

Important characteristics of the present invention are that said demodulation means includes an analog-to-digital-converter having a saturation level which is equal to or larger than the input signals applied to said converter corresponding to said limit value, and that the constant gain corresponding to said substantially linear part of said input-output characteristic is so chosen that received signals corresponding to said smaller signals are demodulated with a bit error rate substantially lower than said error value.

As mentioned above the demodulation means in the present receiver includes an analog-to-digital convertor and the matched filtering, channel equalization and reconstruction of the digital signal are performed in a digital signal processor. The latter processing steps can thus be implemented taking full advantage of digital technology. In a receiver with a demodulation means of the latter type this analog-to digital convertor is a critical block with regard to the dynamic range of the receiver.

Due to the above characteristics of the present invention the limiting amplifier is so chosen that the dynamic range of the converter can be optimally used to provide a linear demodulation of the smaller signals whilst not saturating for the larger signals in view of the limited dynamic range of the converter. Indeed, the demand for a bit error rate substantially lower than the error value defines a received signal level for which the demodulation needs to be fully linear. The choice for the convertor, based on error performance, power consumption and area, then gives rise to saturation levels for this convertor which have to be somewhat larger than the limit values of the limiting amplifier. Finally, in choosing a specific limiting amplifier, for instance the mentioned log-linear amplifier, the thus obtained bounds on its input/output characteristic can be used to choose a characteristic which maximally amplifies the signals in the amplifier's substantially linear part in view of the above limit values in order to provide a better resolution at the input of the analog-to-digital-convertor.

Further characteristics of the present invention are that said demodulation means includes a matched conversion means matched to a conversion means provided in said transmitter to convert said digital signal to said analog signal, the combination of both said conversion means optimizing the signal to noise ratio in said demodulation means, that each of said conversion means includes a square root raised cosine roll off filter with predetermined roll off factor, and that said angle-modulation is π/4-shifted Differential Quadrature Phase Shift Keying.

It has to be noted that the above described modulation scheme is part of a future standard for a digital mobile communications system to be issued by RES06 of ETSI and generally referred to as Trans European TRunked RAdio or TETRA. The present receiver is particularly well suited for this modulation scheme as the matched filtering is crucial for the bit error rate performance of this receiver.

An alternative characteristic of the present invention is that said angle-modulation is Gaussian Minimum Shift Keying.

This modulation method is chosen in the well known GSM standard for mobile communications issued by the Groupe Special Mobile which is to become the pan-European standard for public mobile communications systems. The present receiver is also very well suited for this application since optimal performance for low SNR received signals requires the matched conversion associated to the sinusoidal symbol weighting used in the modulation scheme and also requires channel equalization. As argued above the present receiver achieves the above requirements with a very simple receiver architecture.

The above mentioned and other objects and features of the invention will become more apparent and the invention itself will be best understood by referring to the following description of an embodiment taken in conjunction with the accompanying drawing which shows a schematic diagram of a receiver according to the present invention.

This receiver for instance forms part of a digital mobile communications system such as the above mentioned Trans European TRunked RAdio or TETRA system. The modulation performed in a transmitter (not shown) producing the signals to be demodulated by this receiver will be briefly discussed for clarity's sake.

The transmitter generates a transmitted signal occupying a predetermined frequency band, i.e. a frequency band of 25 kHz in the range from 440 to 470 MHz and corresponding to a digital signal to be transmitted in this frequency band. The transmitted signal is so derived that it is adapted to the transmission in this specific radio channel. This is done in the present system via a modulation method known as π/4-shifted DQPSK which is for instance described in detail in the above referenced paper of Chia-Liang Liu. According to this method the transmitter first derives from the digital system two bitstreams including respectively bits placed on even and uneven positions in the mentioned digital signal. Both bitstreams are then differentially encoded in an in-phase I and a quadrature Q bitstream which are used to modulate sinusoidal carriers having a same frequency but which are shifted with respect to each other over 90°.

However, before the above I and Q bitstreams are used in the transmitter to modulate the sinusoidal carriers the TETRA system will specify that they are to be converted into respective parts of an analog signal the spectrum shape of which is better adapted to the radio transmission. Such conversion consists, in addition to the conventional digital-to-analog-conversion, in spectrum shaping the resultant pulses by filtering them with a square root raised cosine roll off filter with roll off factor 0.35. The aim of such filtering is to reduce the intersymbol interference as described in detail in the above referenced part of the book by B. Sklar. Such interference reduction more particularly shapes the spectrum of the transmitted signal so that it is better adapted to the radio transmission medium and can only be effective when in the receiver also a square root raised cosine filter matched to the one in the transmitter, i.e. having the same roll off factor, is used to filter the received signal.

The modulation in the transmitter is then finalized by multiplying the thus obtained analog signal parts with respective ones of the mentioned sinusoidal carriers and transmitting the sum of these multiplications via an antenna. The frequency of the sinusoidal carrier is so chosen that the transmitted signal occupies the desired frequency band.

In the present system also the minimal performance for the receiver in reconstructing the digital signal from a received signal which is a distorted version, due to the imperfections of the transmission medium, of the above described transmitted signal will be specified. This reconstruction can for instance be specified to have a bit error rate below a predetermined error value for received signals falling within a dynamic range of −113 to −15 dBm. This specified error value is such that the error correcting codes embedded in the digital signal can correct such errors to an extent which is sufficient for obtaining the transmission quality which is imposed in the communications system. From the above it is clear that any bit error rate which is much lower than the specified error value does not lead to any desired or even noticable improvement of the transmission quality.

It is to be noted that although the invention will be further described with reference to the above described communications system, it is equally well suited for other systems using other modulation methods. An important example of such a different digital mobile communications system is the system standardized by and generally known as GSM.

BRIEF DESCRIPTION OF THE DRAWING

The receiver shown in the block diagram drawing receives its signals via a schematically depicted antenna.

BEST MODE FOR CARRYING OUT THE INVENTION

Figure 1:
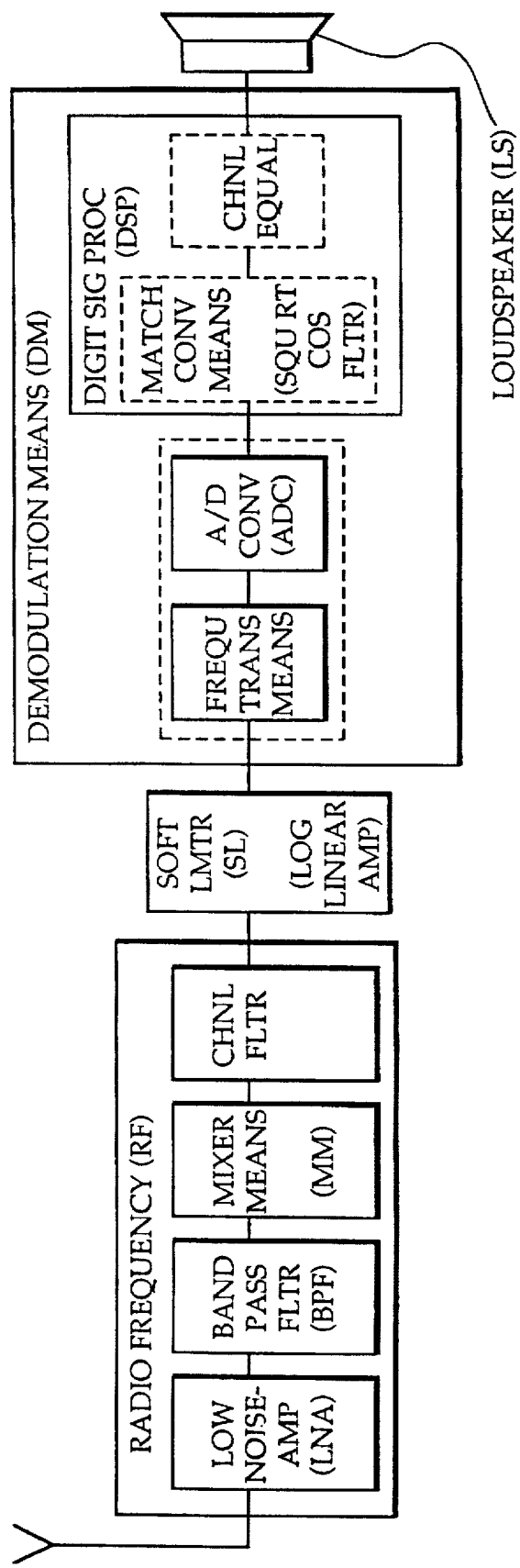

The receiver consists conventionally of a radiofrequency part RF which is adapted to preprocess the received signal at frequencies in the radiofrequency range in order to derive a filtered, amplified and frequency translated version of the received signal generally referred to as intermediate signal.

In the present embodiment all signals falling outside the predetermined frequency band are substantially attenuated by RF and therefore not included in the intermediate signal. The latter signal hence consists solely of the received signal occupying the mentioned predetermined frequency band which is shifted to an intermediate frequency of 10.7 MHz. The intermediate signal is then further adapted in accordance with the present invention by a limiting amplifier or soft limiter SL so that it can be conveniently processed by a demodulation means DM. The latter demodulation means DM further translates the output signal to baseband frequencies, so producing a reconstructed version of the analog signal derived in the transmitter, and recovers therefrom the I and Q bitstreams also formed in the transmitter. If the digital signal which can be recovered in this way by DM is e.g. a voice signal it can be used to drive a loudspeaker LS in a mobile terminal of the communications system.

The radiofrequency part RF of the receiver can be schematically represented as in the drawing. It includes firstly a low noise amplifier LNA which ensures that the SNR of the received signal deteriorates as less as possible due to the noise contribution of the building blocks of the receiver. RF further includes a bandpass filter BPF coupled to LNA and substantially attenuating all signals outside the mentioned predetermined frequency band. Finally RF includes mixer means multiplying the filtered signal with a local oscillator signal having a predetermined frequency in order to shift the frequency spectrum of the received signal downwards over this predetermined frequency.

It is to be noted that RF as described above is only intended to be a schematic representation for the more general case wherein several mixers, amplifiers and bandpass filters are cascaded in order to produce a desired intermediate signal. Indeed, it is usually more appropriate to obtain the required filter selectivity by the combined effect of several bandpass filters in order not to complicate the design of such filters as described below. Generally a first filter will select the above frequency band of 440 MHz to 470 MHz whilst at least one other filter after the mixer means will select the desired predetermined frequency band of 25 kHz. Furthermore, the radiofrequency parts of most known receivers use multiple intermediate frequencies to gradually translate the received signal to lower frequencies. The trade-off which must be made to design a suitable radiofrequency part for the present receiver is well within the capabilities of a person skilled in the art wherefore it will not be described in detail.

The limiting amplifier or soft limiter SL operates at the intermediate frequency of 10.7 MHz and has an input/output characteristic which is logarithmic wherefore it is also called log-linear amplifier. The above specified characteristic is substantially linear for smaller input signals having an amplitude smaller than a predetermined value whilst striving with a decreasing gain to a limit value for larger input values having an amplitude larger than the mentioned predetermined value. This limit value is the output signal level in a specific operating point of the amplifier which corresponds to the largest received signal level within the mentioned dynamic range.

Such amplifiers can be built from the Commercially available log-linear amplifiers such as the SL531 from GEC PLESSEY Semiconductors. From the data sheets of the latter amplifier it can be verified that the logarithmic characteristic of the amplifier is obtained by summing the outputs of two bipolar differential pairs only one of which is linearized with emitter degeneration resistors. The non-linearized differential pair has an output characteristic which is the hyperbolic tangent of the input signal whilst the linearized pair has a constant gain for all input signals of interest. The sum of these two characteristics yields the characteristic described in the above formula with specific parameters for the initial slope of the curve and the gain in a specific operating point. It is however to be noted that a person skilled in the art can, by suitably cascading such commercially available amplifiers, synthesize a limiting amplifier with a desired initial slope and a desired gain in the specific operating point. Such synthesis will therefore not be described in detail and it will be further assumed that the limiting amplifier can in this way be designed to suit the specific needs of the present receiver.

The demodulation means DM is also only schematically represented in the drawing and can for instance be any demodulation means suited for receivers which are fully linear due to the inclusion of an AGC-loop. Only the essential features of DM are explicitly shown in the drawing, i.e. an analog-to-digital-convertor ADC coupled to the limiting amplifier SL and a digital signal processor DSP which makes the actual demodulation choices after having applied the above described matched square root raised cosine filtering and any eventual channel equalization filter. DM also includes further frequency translation means which are used not only to shift the output signal of SL to baseband frequencies but also to separate the I and Q signals. Such means are well known to a person skilled in the art and will not be described in detail. That such frequency translation means are needed in any case after the limiting amplifier SL in the present embodiment follows from the fact that SL as described above isn't designed to operate at baseband frequencies. Moreover, the frequency translation to baseband signals in the present communications system, which uses quadrature modulation, is best applied together with the separation of the I and Q signals and after such separation the limiting operation becomes more complicated. It can indeed be easily verified that limiting the separated I and Q signals gives a quite different result from limiting the composite signal.

With reference to the drawing the operation of the receiver will now be described in detail.

For received signals with a low SNR, i.e. signals at the bottom of the specified dynamic range, the input signals to SL are smaller than the predetermined value or threshold and are hence amplified substantially linearly. Because such signals are treated linearly up to the demodulation means DM, the above mentioned matched filtering, through a matched square root raised cosine roll off filter, can be performed in DM. In this way the receiver performs nearly optimally for these signals which results in low bit error rates.

It is to be noted that this matched filtering can also be advantageously carried out in the digital signal processor DSP using small and power efficient digital technology. It is moreover possible to further improve the performance of the receiver for these low SNR received signals by including in DSP a channel equalization filter compensating for the variable distortion of the received signal incurred in the transmission medium. Such equalization may generally be of the type described in the mentioned book of B. Sklar, pp. 104–106. This channel equalization is in most mobile digital communications systems based on a predetermined training sequence embedded in the transmitted signal on predetermined positions.

It is however clear that such nearly optimal performance cannot be maintained for all received signals falling within the specified dynamic range without taking special measures. Indeed, if SL were a linear amplifier over the total dynamic range the analog-to-digital-convertor ADC would start to saturate for some received signal level within the dynamic range since ADC would be prohibitively large if its dynamic range equalled the total specified dynamic range. Generally speaking it would be impossible with state of the art technology to design a receiver all building blocks of which have a dynamic range equalling the specified dynamic range. A common solution for the above problem is the inclusion of an automatic gain control or AGC-loop which ensures that the signal forwarded to DM falls within the dynamic range of DM.

It is however not necessary to keep the performance of the receiver nearly optimal for high SNR received signals, i.e. those signals at the top of the specified dynamic range, since the bit error rate naturally tends to decrease with increasing SNR. Indeed the invention is based on the insight that one can trade off for the latter signals, receiver performance against receiver complexity whilst still staying below the specified error value.

This is realized via the above described limiting amplifier SL which amplifies these larger signals increasingly non-linearly until a limit value is reached for input signal amplitudes corresponding to the largest received signal levels within the specified dynamic range. It is to be noted that simply letting ADC saturate for these larger signals is unallowable because of the severe adverse effect this would have on the operation of the receiver.

It is clear that the larger the received signals get the more non-linear the amplification of the above described SL becomes. This non-linear distortion before DM also means that the raised cosine and equalization filtering performed in DM no longer optimizes the error performance of the receiver for these larger signals due to the non-linear element SL. In fact this effect is progressively stronger, and the error performance thus progressively less optimal, the larger the received signals are. However, viewed in absolute terms the bit error rate naturally decreases for larger signals and the aforementioned effects can be so influenced, as described in detail later, that the negative effect of the non-linearity is compensated and that the bit error rate for all received signals within the specified dynamic range falls below the specified error value.

In order to meet the above specifications the exact parameters of the input-output characteristic of SL are of critical importance wherefore some detailed values will be given hereafter in view of the trade-offs that must inevitably be made.

A first important element therein is the highest received signal level which needs to be treated substantially linearly in order to keep the bit error rate for this signal level below the specified error value. This received signal level forms a first constraint on the characteristic of the limiting amplifier SL. Indeed, this characteristic has to be substantially linear for all input signals corresponding to received signal amplitudes below the mentioned highest received signal amplitude. All received signal amplitudes above the latter level can be demodulated with a sub-optimal receiver performance, whilst staying below the specified error value as mentioned above, so that the characteristic of SL may be adapted to avoid saturation of ADC.

A second important element in the trade-off is the nature of this analog-to-digital-convertor ADC. Indeed, in choosing for instance a 10-bit ADC and in choosing the smallest signal which needs to be resolved by ADC, one can easily derive the input signal level to ADC for which the latter saturates. As such saturation is unallowable this highest input level has to be equal to or lower than the input level corresponding to the largest received signal level within the specified dynamic range, and hence the saturation level of ADC can be chosen to be below the limit value of SL.

With the above two bounds on the characteristic of SL and in choosing a specific SL such as for instance the above described log-linear amplifier, the parameters of such an amplifier SL can be so chosen to meet the above demands. The above can be done whilst providing an as large as possible gain in the substantially linear part of SL so as to put no undue burden on the resolution requirements of ADC. Indeed, the more the received signals which are to be treated linearly are amplified, the coarser the resolution of ADC may be.

It is clear that the above described trade-off can only be solved empirically and case-by-case since for instance the bit error rate versus SNR curve must be computed for every combination of parameters in order to check whether the highest received signal level which is to be treated linearly is demodulated with a bit error rate below the specified error value. Therefore the details regarding the crucial building blocks SL and ADC will be given hereafter only for a receiver designed to operate in a digital mobile communications system according to the above specifications.

It can be verified that the above trade-off is met within the above specified bounds if the specifications for the critical building blocks of the receiver as described hereafter are used. The total linear gain of the radiofrequency part RF is 15 dB up to SL and the filter means included in RF are designed as mentioned earlier so as to attenuate all frequencies outside the predetermined frequency band. The receiver noise level measured at the input of SL is −108 dBm whereas the input signal amplitude corresponding to the smallest received signal level within the specified dynamic range is −98 dBm. The substantially linear gain of SL results for the last mentioned signal amplitudes in output signal levels of respectively −45 and −35 dBm and this gain remains substantially linear upto an input signal amplitude of −65 dBm which therefore yields an output level of −2 dBm. The latter input signal amplitude is the above mentioned predetermined value or threshold below which the smaller input signals are situated. The limit values associated to SL occur for input signal amplitudes of 0 dBm and equal output signal levels corresponding to 3 dBm. The log-linear characteristic of SL satisfying the above described criterions is of course anti-symmetric around the origin. ADC is a 10 bit convertor with a dynamic range of 55 dB extending from −51 dBm to 4 dBm, the latter value being the saturation level of ADC.

It is finally to be noted that the total linear dynamic range as a result of the above parameters extends from received signal levels from −113 dBm to −80 dBm.

It has also to be noted that the selectivity of the bandpass filter BPF is critical for the correct operation of the present receiver. Indeed, even if the part of the received signal which is to be demodulated falls in the linear range of the receiver, signals outside the predetermined frequency band might be so large as to address the non-linear part of the characteristic of SL and give rise to intermodulation products which overlap the useful signal after SL and therefore totally destroy any possibility of reconstructing the transmitted digital signal. Therefore the selectivity of BPF must be such that all signals outside the predetermined frequency band are attenuated so that the distortion through intermodulation is avoided. In the present receiver such selectivity can be achieved via well known quartz filters which are commercially available. The design of such filters are well within the capabilities of a person skilled in the art and will therefore not be described in detail. If this selectivity would be too high to be achieved by a single bandpass filter, the RF part of the receiver can be designed to include two or more mixers and hence also two or more intermediate signals and to achieve the required selectivity by filtering progressively the subsequent intermediate signals.

While the principles of the invention have been described above in connection with specific apparatus, it is to be clearly understood that this description is made only by way of example and not as a limitation on the scope of the invention.

We claim:

1. A radio receiver wherein a digital signal is recovered from a received signal corresponding to a transmitted signal generated in a transmitter by angle-modulating a carrier signal with an analog signal converted from said digital signal and occupying a predetermined frequency band, said receiver including:
   filter means (BPF) attenuating that part of said received signal outside said frequency band and so deriving an intermediate input signal;
   a radio receiver limiting amplifier (SL) amplifying said intermediate input signal to provide a resulting intermediate output signal having an amplified amplitude which remains smaller than a limit value; and
   demodulation means (DM) recovering said digital signal from said intermediate output signal with a bit error rate below a predetermined error value if the received signal level falls within a predetermined dynamic range;
   characterized in that said radio receiver limiting amplifier (SL) has an input-output characteristic which is substantially linear for said intermediate input signal if said intermediate input signal has an amplitude smaller than a predetermined value such that said intermediate input signal having an amplitude smaller than said predetermined value is treated linearly up to said demodulation means, and said demodulation means recovers said digital signal from said intermediate output signal with said bit error rate below said predetermined error value, and wherein said radio receiver limiting amplifier has an input-output characteristic which strives with a decreasing gain towards said limit value for said intermediate input signal if said intermediate input signal has an amplitude larger than said predetermined value such that said intermediate input signal having an amplitude larger than said predetermined value is treated non-linearly up to said demodulation means, and performance degradation in said demodulation means recovering said digital signal from said intermediate output signal is compensated by said intermediate input signal having an amplitude larger than said predetermined value being demodulated with less errors with said bit error rate remaining below said predetermined error value, each said intermediate input signal corresponding to a received signal having said received signal level within said dynamic range.

2. A radio receiver according to claim 1, characterized in that said demodulation means (DM) includes frequency translation means for translating said intermediate signal to baseband.

3. A radio receiver according to claim 2, characterized in that said radio receiver limiting amplifier (SL) is a log-linear amplifier whose limit value equals the output signal level generated for the largest received signal level within said dynamic range.

4. A radio receiver according to claim 1, characterized in that said demodulation means (DM) includes a matched conversion means matched to a conversion means provided in said transmitter to convert said digital signal to said analog signal, the combination of both said conversion means optimizing the signal to noise ratio in said demodulation means.

5. A radio receiver according to claim 4, characterized in that each of said conversion means includes a square root raised cosine roll off filter with predetermined roll off factor.

6. A radio receiver according to claim 5, characterized in that said angle-modulation is $\pi/4$-shifted Differential Quadrature Phase Shift Keying.

7. A radio receiver according to claim 1, characterized in that said demodulation means (DM) further includes channel equalization means compensating for the distortion inflicted by the transmission channel.

8. A radio receiver according to claim 1, characterized in that said angle-modulation is Gaussian Minimum Shift Keying.

9. A radio receiver according to claim 8, characterized in that said demodulation means (DM) includes an analog-to-digital-converter (ADC) having a saturation level which is equal to or larger than the input signals applied to said converter (ADC) corresponding to said limit value.

10. A radio receiver according to claim 9, characterized in that the constant gain corresponding to said substantially linear part of said input-output characteristic is so chosen that a received signal corresponding to said intermediate input signal having an amplitude smaller than said predetermined value is demodulated with a bit error rate substantially lower than said error value.

11. A radio receiver according to claim 1, characterized in that said demodulation means (DM) includes an analog-to-digital-converter (ADC) having a saturation level which is equal to or larger than the input signals applied to said converter (ADC) corresponding to said limit value.

12. A radio receiver wherein a digital signal is recovered from a received signal corresponding to a transmitted signal generated in a transmitter by angle-modulating a carrier signal with an analog signal converted from said digital signal and occupying a predetermined frequency band, said receiver including:
   filter means attenuating that part of said received signal outside said frequency band and so deriving an intermediate input signal;
   a radio receiver limiting amplifier amplifying said intermediate input signal to provide a resulting intermediate output signal having an amplified amplitude which remains smaller than a limit value; and
   demodulation means recovering said digital signal from said intermediate output signal with a bit error rate below a predetermined error value if the received signal level falls within a predetermined dynamic range;
   characterized in that said radio receiver limiting amplifier has an input-output characteristic which is substantially linear for said intermediate input signal if said intermediate input signal has an amplitude smaller than a predetermined value such that said intermediate input signal having an amplitude smaller than said predetermined value is treated linearly up to said demodulation means, and said demodulation means recovers said digital signal from said intermediate output signal with said bit error rate below said predetermined error value, and wherein said radio receiver limiting amplifier has an input-output characteristic which strives with a decreasing gain towards said limit value for said intermediate input signal if said intermediate input signal has an amplitude larger than said predetermined value such that said intermediate input signal having an amplitude larger than said predetermined value is treated non-linearly up to said demodulation means, and performance degradation in said demodulation means recovering said digital signal from said intermediate output signal is compensated by said intermediate input signal having an amplitude larger than said predetermined value being demodulated with less errors with said bit error rate remaining below said predetermined error value, each said intermediate input signal corresponding to a received signal having said received signal level within said dynamic range; and in that said demodulation means includes:

a matched conversion means matched to a conversion means provided in said transmitter to convert said digital signal to said analog signal, the combination of both said conversion means optimizing the signal to noise ratio in said demodulation means; and channel equalization means compensating for the distortion inflicted by the transmission channel.

13. A radio receiver according to claim 12, characterized in that said demodulation means (DM) includes frequency translation means for translating said intermediate signal to baseband.

14. A radio receiver according to claim 13, characterized in that said radio receiver limiting amplifier (SL) is a log-linear amplifier whose limit value equals the output signal level generated for the largest received signal level within said dynamic range.

15. A radio receiver according to claim 12, characterized in that each of said conversion means includes a square root raised cosine roll off filter with predetermined roll off factor.

16. A radio receiver according to claim 15, characterized in that said angle-modulation is $\pi/4$-shifted Differential Quadrature Phase Shift Keying.

17. A radio receiver according to claim 12, characterized in that said angle-modulation is Gaussian Minimum Shift Keying.

18. A radio receiver according to claim 17, characterized in that 'said demodulation means (DM) includes an analog-to-digital-converter (ADC) having a saturation level which is equal to or larger than the input signals applied to said converter (ADC) corresponding to said limit value.

19. A radio receiver according to claim 18, characterized in that the constant gain corresponding to said substantially linear part of said input-output characteristic is so chosen that a received signal corresponding to said intermediate input signal having an amplitude smaller than said predetermined value is demodulated with a bit error rate substantially lower than said error value.

20. A radio receiver according to claim 12, characterized in that said demodulation means (DM) includes an analog-to-digital-converter (ADC) having a saturation level which is equal to or larger than the input signals applied to said converter (ADC) corresponding to said limit value.

* * * * *

UNITED STATES PATENT AND TRADEMARK OFFICE
CERTIFICATE OF CORRECTION

PATENT NO. : 5,703,910
DATED : December 30, 1997
INVENTOR(S) : Durvaux et al

It is certified that error appears in the above-identified patent and that said Letters Patent is hereby corrected as shown below:

Item [57]

In the Abstract, line 18, "Latter" should be --latter--.

In column 14, claim 18, line 2, " 'said" should be --said--.

Signed and Sealed this

Twenty-first Day of April, 1998

Attest:

BRUCE LEHMAN

Attesting Officer

Commissioner of Patents and Trademarks